(12) United States Patent
Richter

(10) Patent No.: US 7,517,251 B2
(45) Date of Patent: Apr. 14, 2009

(54) CONTACT ASSEMBLY FOR A CHIP CARD

(75) Inventor: Michael Richter, Schalksmühle (DE)

(73) Assignee: Lumberg Connect GmbH, Schalksmuhle (DE)

( * ) Notice: Subject to any disclaimer, the term of this patent is extended or adjusted under 35 U.S.C. 154(b) by 0 days.

(21) Appl. No.: 11/703,054

(22) Filed: Feb. 6, 2007

(65) Prior Publication Data
US 2007/0182434 A1    Aug. 9, 2007

(30) Foreign Application Priority Data
Feb. 7, 2006   (DE) ................... 10 2006 005 731

(51) Int. Cl.
*H01R 24/00* (2006.01)
(52) U.S. Cl. .............. 439/630; 439/620.08; 439/620.04
(58) Field of Classification Search ................. 439/629, 439/630, 620.04, 620.08; 361/737, 730
See application file for complete search history.

(56) References Cited

U.S. PATENT DOCUMENTS

| | | | |
|---|---|---|---|
| 4,116,524 A * | 9/1978 | DeNigris et al. ............ 439/490 |
| 5,005,106 A * | 4/1991 | Kiku ............................ 361/818 |
| 5,586,890 A * | 12/1996 | Braun .......................... 439/66 |
| 5,775,949 A | 7/1998 | Bricaud |
| 6,145,037 A * | 11/2000 | Sakakibara .................. 710/301 |
| 6,547,597 B2 * | 4/2003 | Harris, IV ............. 439/620.22 |
| 6,607,135 B1 * | 8/2003 | Hirai et al. ................... 235/487 |
| 6,863,537 B2 | 3/2005 | Pellizari |
| 6,955,551 B2 * | 10/2005 | Yamamoto .................. 439/181 |
| 2004/0157474 A1 * | 8/2004 | Rapaich ....................... 439/43 |

FOREIGN PATENT DOCUMENTS

| | | |
|---|---|---|
| DE | 42 18 970 | 12/1993 |
| DE | 44 11 345 | 5/1995 |

* cited by examiner

*Primary Examiner*—Tho D Ta
*Assistant Examiner*—Travis Chambers
(74) *Attorney, Agent, or Firm*—Andrew Wilford

(57) ABSTRACT

A chip-card holder for connecting contact pads of a chip card with connections of device circuitry. The holder has a dielectric holder body engageable between the chip card and the device connections, a plurality of contact elements on the body each having a contact part engageable with a respective one of the chip-card contact pads, a connecting part connectable to a respective one of the device connections and an anchor part, means securing each of the anchor parts directly to the holder body, and an electronic circuit element mounted on the holder body and connected to the contact elements.

11 Claims, 5 Drawing Sheets

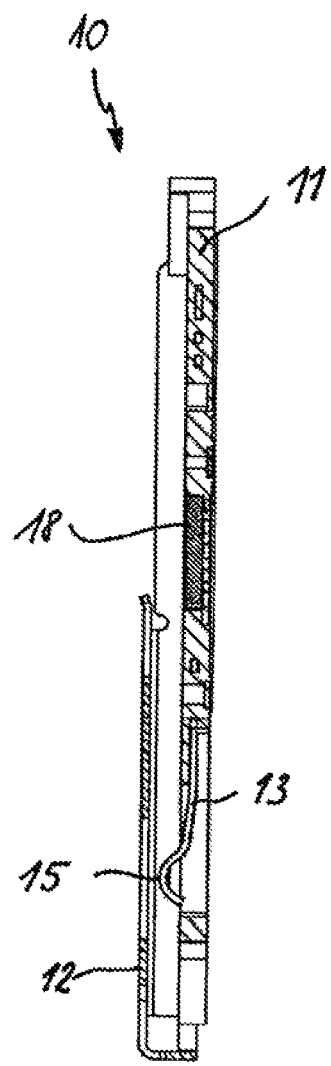
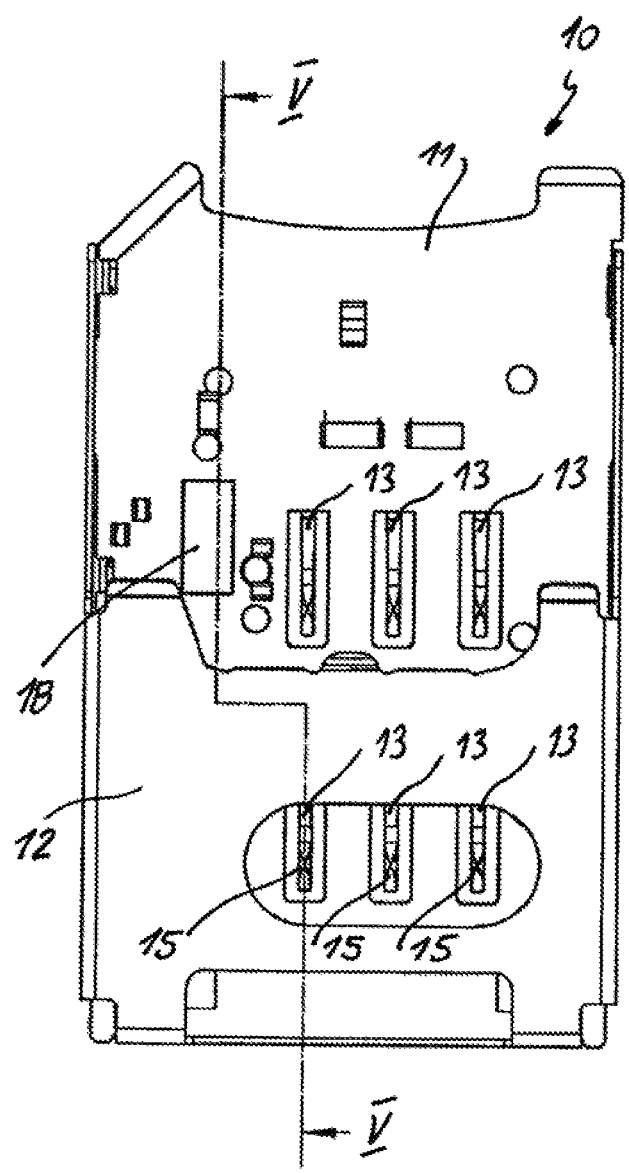
Fig. 5
Fig. 4

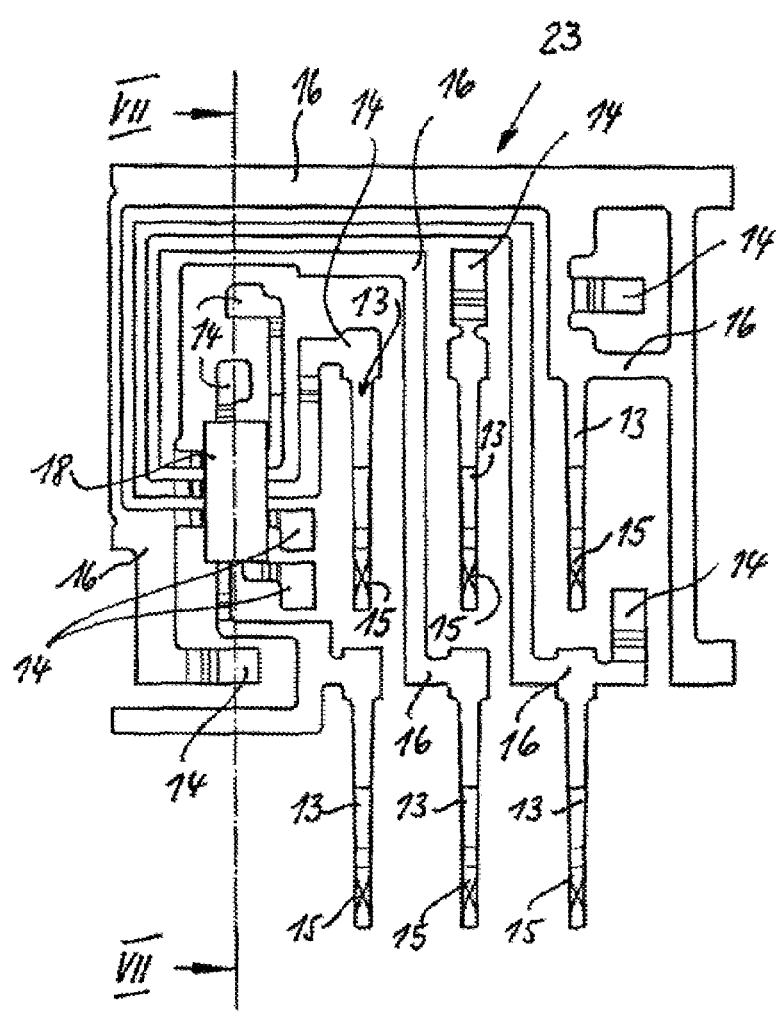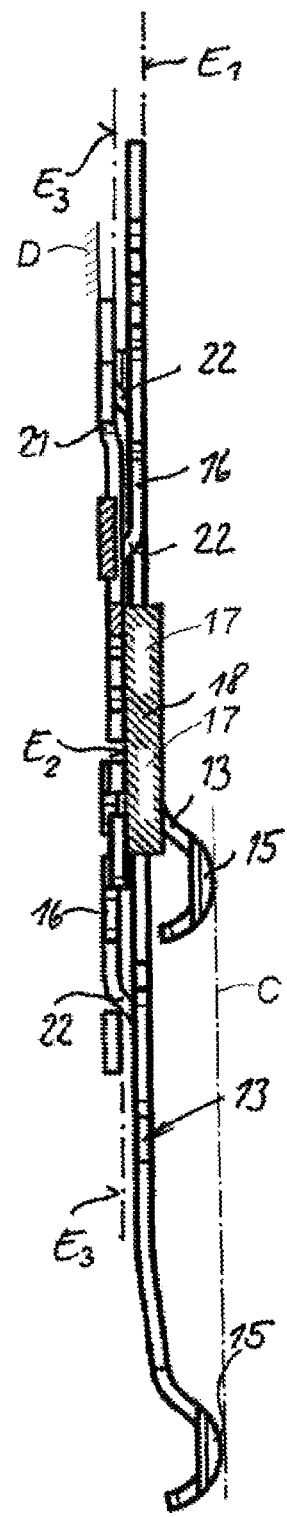
Fig. 6
Fig. 7

CONTACT ASSEMBLY FOR A CHIP CARD

FIELD OF THE INVENTION

The present invention relates to a contact assembly. More particularly this invention concerns a contact assembly for a chip card.

BACKGROUND OF THE INVENTION

A standard chip card holds an integrated circuit and is of flat rectangular shape with one corner cut off for indexing purposes. One face of the card is provided with a group of contact pads by means of which connection can be made to the integrated circuit. In use the card is fitted to a holder, for instance mounted in the bottom of a cell-phone battery compartment, where it is held with these contact pads pressed against respective resilient contacts of a contact assembly.

Such a contact assembly for a chip card, in particular for a subscriber-identity-module (SIM) card of an electronic device such as a chip-card reader, mobile telephone, or the like, has a contact support made of insulating material and contact elements anchored therein for connecting the contact pads of the chip card with printed conductors of circuitry contained in the device, such as a printed-circuit board. Each such contact element has a contact part that engages the chip card, a connecting part for contacting the circuitry, and an anchor part for fixing to the contact support.

The anchor parts are attached to the insulating material of the contact support usually by extrusion coating. The contact part or end of the contact element bears resiliently on the contact pads of the chip card, and the other connecting end or part or each contact element is normally soldered to the printed conductor for the circuitry. This is usually done according to the surface mounting technique (SMT). The connecting ends can also form press-on contacts which bear resiliently the printed-circuit conductors.

Such assemblies are described in German patents is 42 18 970 and 44 11 345 as well as in U.S. Pat. Nos. 5,775,949 and 6,863,537.

OBJECTS OF THE INVENTION

It is therefore an object of the present invention to provide an improved chip-card contact assembly.

Another object is the provision of such an improved chip-card contact assembly that improves on the above-describes assemblies.

SUMMARY OF THE INVENTION

A chip-card holder for connecting contact pads of a chip card with connections of device circuitry. The holder has according to the invention a dielectric holder body engageable between the chip card and the device connections, a plurality of contact elements on the body each having a contact part engageable with a respective one of the chip-card contact pads, a connecting part connectable to a respective one of the device connections and an anchor part, means securing each of the anchor parts directly to the holder body, and an electronic circuit element mounted on the holder body and connected to the contact elements.

These electronic circuit elements built into the contact assembly have according to the invention a protective function, such as a protecting against excess current, excess voltage, or high-frequency energy, and/or may be an EMI filter protecting against electromagnetic disturbances. Alternatively or additionally, the components may comprise pull-up or pull-down resistors.

Such electronic circuit elements are usually located on the circuitry for the device, i.e. on the printed-circuit board of a mobile telephone, for example. They are used primarily to provide protective functions against excess current, excess voltage, or electromagnetic interference (EMI), which may occur during handling of the card or during proper use of the card or the device.

Consequently, the essence of the present invention lies in the fact that these conventional, commonly required components are removed from the circuitry of the device and placed in the contact assembly. A number of advantages are thus realized.

First, space is saved on the printed-circuit board inside the device, which space may be used for providing different or additional components, which is particularly important in light of the trend toward increasing the number of functions of the devices without having to take into account an increase in the size thereof, or even further miniaturization of the devices.

A further advantage is simplification of the layout of the printed-circuit board for the device, and the fact that the device manufacturer no longer needs to be concerned with the electronic details necessary for operation of the chip card. As a result of the invention, this task is assumed by the supplier who makes the contact assembly.

Specifically, the components in question are primarily varistors. These are voltage-dependent resistors whose resistance abruptly decreases when a given threshold voltage that is typical for the particular varistor is exceeded. Varistors are therefore very well suited for excess-voltage protection, and consequently are used for protecting sensitive electronic circuits. The above-mentioned pull-up or pull-down resistors are used to either increase an electrical voltage to operating voltage or to decrease an electrical voltage to ground. For digital input, such resistors ensure the correct high or low logical input level for an open contact.

In a further embodiment of the invention, the electronic circuit elements are integrated into a chip. According to a further embodiment of the invention, the components or the integrated-circuit (IC) chip holding them are extrusion-molded at least in part so that they are imbedded in the insulating material of the contact support body. However, the chip may also be simply fitted into a recess or seat formed in the holder body and intended to hold the IC chip.

The contact elements according to the invention may be formed from a stamped grid that forms connection pads for contact surfaces located on the electronic circuit elements or on the chip.

Within the scope of the invention, discrete electronic circuit elements are possible in principle as an integral component of a generic contact assembly, although a chip is preferred which is able to accommodate components that are highly integrated and therefore extremely compact. This applies particularly in light of the fact that a contact assembly of the generic type or according to the invention is itself a very compact part.

In this respect, it is possible to particularly efficiently integrate the circuit elements into the contact assembly. According to a further embodiment, the invention proposes that sections of the stamped grid are provided, at least in places, in different levels. Thus, the bond pads for the electronic circuit elements or the chip may be provided in a level above the base level in the stamped grid, and the soldered bond pads for the contact elements may be provided in a subsequent level. The particular distance or offset of the levels maybe formed by right-angle bends, i.e. step-shaped deformations, for the corresponding sections of the stamped grid.

With regard to the more specific integration of the chip into the contact support for the contact assembly, it is possible to extrusion-coat the chip on all sides with the insulating material of the contact support. On the one hand this has manufacturing advantages, since in the ideal situation the chip may be imbedded in the same step used to imbed the contact elements in the holder body. On the other hand, this complete encapsulation of the chip in the insulating material of the contact support provides optimal protection from external influences.

The chip may be soldered or glued to the bond pads of the stamped grid. This is usually performed before the chip is imbedded in the insulating material of the contact support, which is typically done when the support body is cast around the contact elements and chip in a mold in which the subassembly formed by these contact elements and the chip are held.

It is also possible as discussed above to fit the chip in a receptacle or seat intended for holding it. From a manufacturing standpoint, for extrusion coating of the contact elements such a receptacle would be designed as a holding pocket into which the chip is subsequently, i.e. following any other fabrication for the contact assembly, inserted and attached by soldering, gluing, or the like.

BRIEF DESCRIPTION OF THE DRAWING

The above and other objects, features, and advantages will become more readily apparent from the following description, reference being made to the accompanying drawing in which:

FIG. 4 is a top view of the holder of FIG. 1;

FIG. 5 is a section taken along line V-V of FIG. 4;

FIG. 6 is a large-scale top view of the contact assembly;

FIG. 7 is a section taken alone line VII-VII of FIG. 6;

SPECIFIC DESCRIPTION

Figure 1:
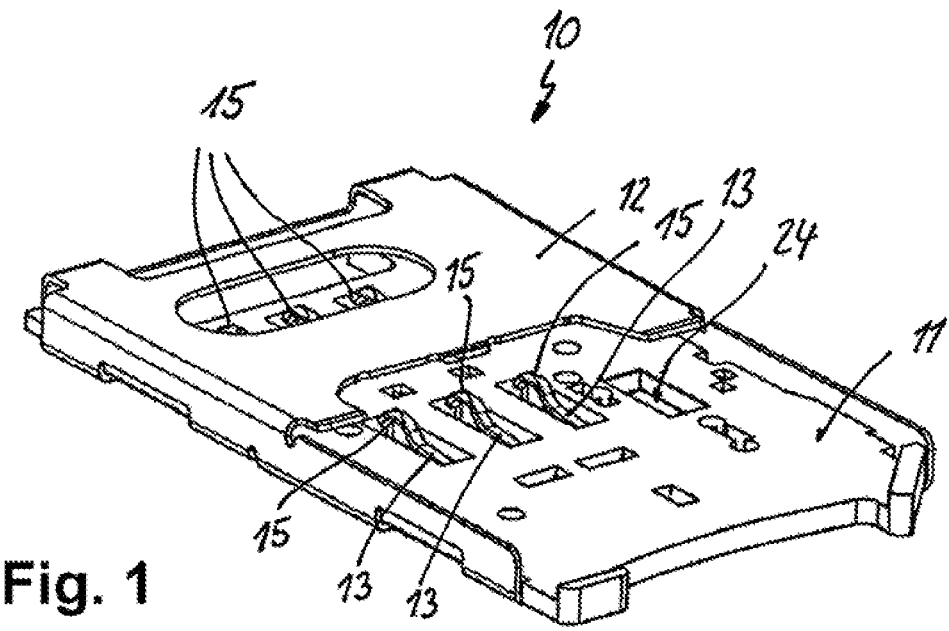
FIG. 1 is a perspective view of a chip-card holder equipped with a contact assembly according to the invention.
Figure 3:
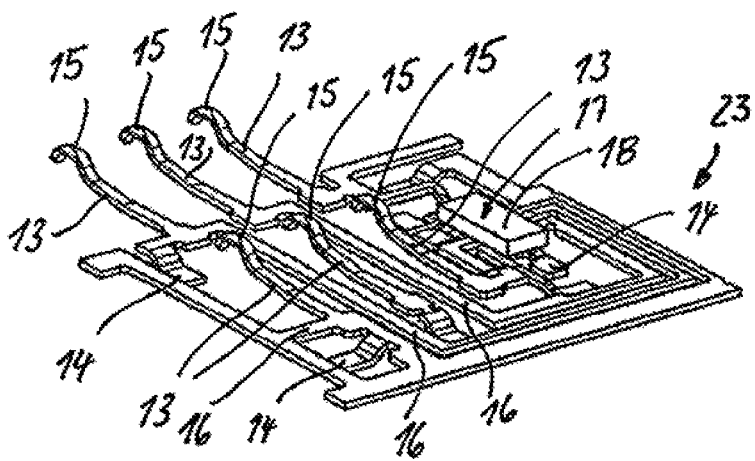
FIG. 3 is a perspective view of the contact assembly of the holder of FIG. 1.
Figure 2:
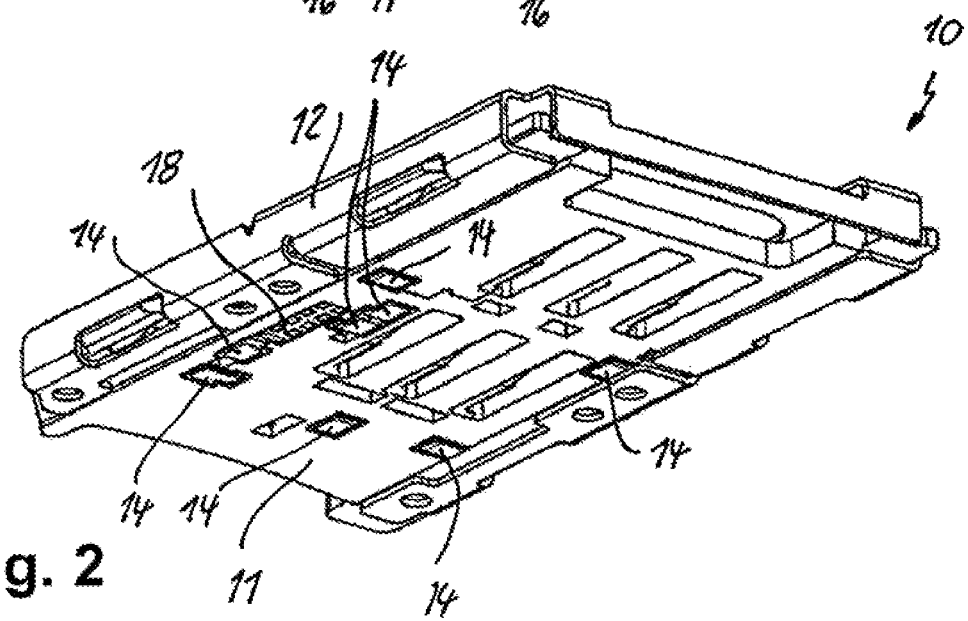
FIG. 2 is a perspective view from below of the holder of FIG. 1.

As seen in FIG. 1 a contact assembly 10 for chip cards, in particular for SIN cards as used, for example, in mobile telephones comprises a plastic support body 11 and a normally metallic cover 12 extending over a portion of its surface. The cover 12 could also be designed as a lid hinged to the contact support 11 as is well known in the prior art.

In the illustrated embodiment, six contact elements 13 in the form of reader contacts are provided in the contact support 11 that is made of an electrically dielectric insulating material, in particular plastic, for contacting the contact surfaces of a SIM card shown schematically at C in FIG. 7 that is inserted into the assembly 10 in a known manner between the contact support 11 and the cover 12. SMD solder feet shown at reference numeral 14 are used for establishing an electrically conductive connection to device circuitry similarly shown schematically in FIG. 7 at D, in particular a printed-circuit board.

In the instant invention, the contact elements 13 each have a contact part 15 for contacting the contact surfaces of the chip C. The respective solder feet 14 at the other end of each contact element 13 form the connection parts for contacting the printed conductors for the device circuitry D. Between its contact part 15 and the associated connection part or solder foot 14, each contact element 13 has at least one anchor part 16 by means of which it is fastened in the contact support 11 by extrusion molding.

The distinctive feature lies in the fact that electronic circuit elements 17 (FIG. 7 only) are integrated into the contact support 11, which in the illustrated embodiment are implemented as an IC chip 18. This chip 18 includes, for example, varistors and/or pull-up and/or pull-down resistors.

These electronic circuit elements are connected to some of the contact elements 13 at their contact parts 15, anchor parts 16, or connection parts 14 in a one-piece, unitary manner, i.e. permanently. Other contact elements 13 are not continuous. In this case the anchor parts 14 provide connection pads 20 for contact surfaces 19 of the chip 18. This is illustrated most clearly in FIGS. 8 and 10. One can also see that several of these component bond pads 20 are in direct unitary connection with connection parts or solder feet 14, and the other component bond pads are connected to the contact parts 15 primarily via orthogonally directed regions.

Figure 8:
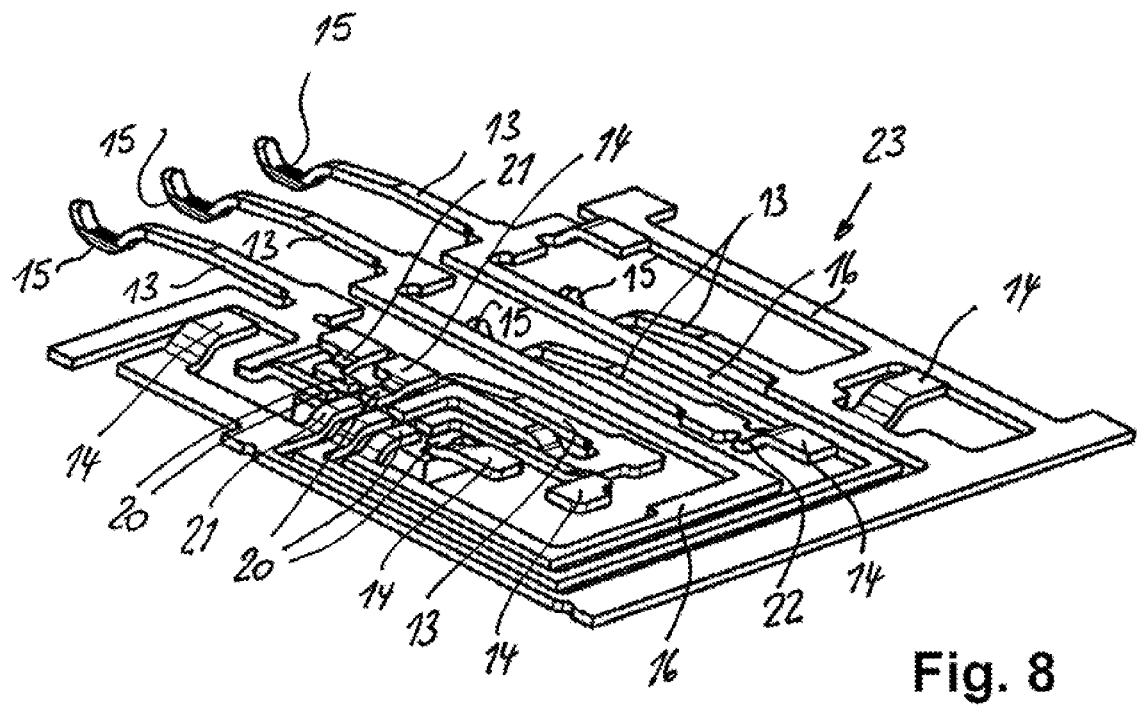
FIG. 8 is a large-scale perspective view of the contact assembly.
Figure 9:
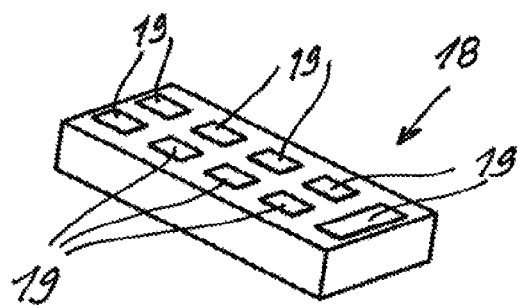
FIG. 9 is a large-scale perspective view of a chip forming part of the contact assembly in accordance with the invention.
Figure 10:
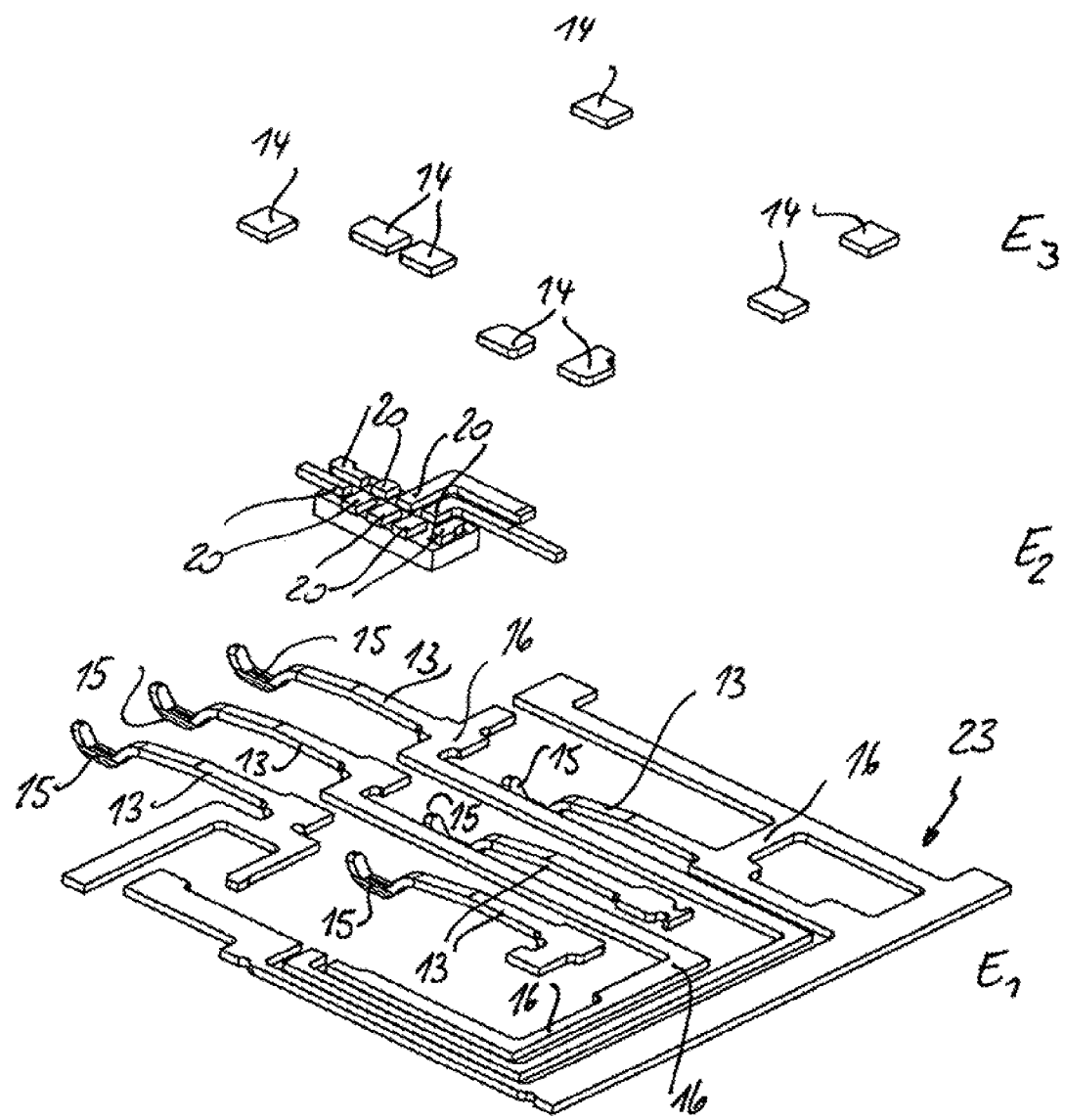
FIG. 10 is a schematic exploded view of the assembly of the instant invention.

In order to take into account the overall height, although small, of the chip 18 that is approximately 0.5 mm thick, 1.5 mm wide, and 3.3 mm long, for example, as well as the fact that only the connection parts 14 are permitted to contact the printed conductors of the circuitry for the device, the entire contact system corresponding to FIG. 8 is configured in three planes or levels $E_1$, $E_2$, and $E_3$, which in FIG. 10 are shown in an exploded illustration. Level $E_3$ faces the circuitry D for the device, and level $E_1$ faces the chip card C to be inserted into the contact assembly. With the exception of the contact parts 15, the contact element parts associated with level $E_1$ are embedded, at least for the most part, as the anchor parts 16 in the plastic material of the contact support 11. All connection elements 20 for the electronic circuit elements 17 or for the chip 18 are in the next level $E_2$, and only the connection parts or solder feet 14 are at a further level $E_3$.

Strictly speaking, there is also a fourth level, namely, the level of the reader contact parts 15 exiting from the contact support 11 in the direction of the chip card.

The small distances between levels $E_1$ and $E_2$ and between levels $E_2$ and $E_3$ are formed by steps in the form of small right-angle bends 21 and 22. The steps 21 lead from level $E_1$ or $E_2$ to the respective next level $E_2$ or $E_3$, whereas steps 22 represents a transition, twice the size, from level $E_1$ to level $E_3$. Levels $E_1$, $E_2$, and $E_3$ as well as several of the right-angle bend steps 21 and 22 are also illustrated in FIG. 7.

The electronic circuit elements 17 of the chip 18 are preferably integrated by at least partial or also complete extrusion coating or imbedding in the insulating material of the contact support 11. However, the chip 18 may also be inserted into a seat 24 in the contact support 11, after which the contact support, including the recess 24, has otherwise been completely fabricated.

I claim:

1. A chip-card holder for connecting contact pads of a chip card with connections of device circuitry, the holder comprising:

a dielectric holder body engageable between the chip card and the device connections;

a plurality of thin sheet-metal contact elements on the body each having a contact part engageable with a respective one of the chip-card contact pads, a connecting part connectable to a respective one of the device connections and an anchor part;

means securing each of the anchor parts directly to the holder body; and an electronic circuit element mounted on the holder body and connected to the contact elements, the contact elements being bent to lie in three planes, one of the planes serving for connection of the contact elements to the circuit element, and another of the planes serving for connection to the device circuitry.

2. The chip-card holder defined in claim 1 wherein the means securing the anchor parts is an integral part of the holder body cast directly over the anchor parts.

3. The chip-card holder defined in claim 1 wherein the circuit element is soldered to the contact elements.

4. The chip-card holder defined in claim 1 wherein the circuit element is glued to the contact elements.

5. The chip-card holder defined in claim 1 wherein the circuit element is a chip-protecting device.

6. The chip-card holder defined in claim 5 wherein the protecting device protects the chip card against excess current, excess voltage, high-frequency signals, or electromagnetic disturbances.

7. The chip-card holder defined in claim 5 wherein the circuit element is a pull-up or pull-down resistor.

8. The chip-card holder defined in claim 5 wherein the circuit element is a varistor.

9. The chip-card holder defined in claim 1 wherein the circuit element is part of an integrated-circuit chip.

10. The chip-card holder defined in claim 9 wherein the holder body is formed with a recess seat in which the electronic integrated-circuit chip is fitted.

11. The chip-card holder defined in claim 10 wherein the integrated-circuit chip is wholly imbedded in the material of the holder body.

* * * * *